Patented Sept. 10, 1946

2,407,483

UNITED STATES PATENT OFFICE 2,407,483

TREATING FIBROUS GLASS

Paul Ebaugh, Granville, Ohio, assignor, by mesne assignments, to Owens-Corning Fiberglas Corporation, a corporation of Delaware No Drawing. Original application April 10, 1937, Serial No. 136,234. Divided and this application November 27, 1940, Serial No. 367,439

7 Claims. (Cl. 117—124)

The present invention relates to treatment of fibrous glass, and more particularly to a method for improving its qualities such as softness, feel, pliability, flexibility, strength, resistance to abrasion, texture, and reduction of brashiness. This application is a division of my copending application Serial Number 136,234, filed April 10, 1937, now Patent No. 2,261,148, dated November 4, 1941, in which a method of treating fibrous glass with hydrofluoric acid is described and claimed.

It is an object of the invention to provide a method of treating fibrous glass, particularly when in mat, sliver, cloth, yarn, thread, cable, fabric or other form, in order to improve the above mentioned physical properties.

Another object of the invention is to provide a method for reducing the diameter size of the fibers to less than the diameter of the fabricated fibers or filaments.

Another object of the invention is to provide a method of treating fibrous glass in order to thoroughly clean the surface of the fibers, rendering it more receptive to a coating material, and if a lubricating medium is applied, mutual scratching and fracturing of the fibers may be more perfectly inhibited.

Another object of the invention is to smooth out any cracks, fissures, projections, or other points of stress concentration in order to increase the strength of the glass fibers and reduce the possibility of fracture at these points.

Another object of the invention is to provide a method of treating interwoven glass cloths or yarns in order to remove fuzzy, loose or upstanding ends and the like without impairing the fibers within the yarns or cloth.

Broadly stated, my invention contemplates treating fibrous glass with a suitable substance capable of etching the same, or reacting with the surface thereof, or with certain of the ingredients therein, whereby the surface may be cleaned, smoothed off, or partially eaten away to a predetermined degree, according to the degree of treatment and the concentration of the solution used in treating the fibrous glass.

As examples of some of the substances which may be used to treat the fibrous glass, there may be mentioned basic substances such as alkali bases, and more particularly potassium hydroxide or sodium hydroxide solution.

In practicing the invention, however, I preferably use an alkali hydroxide such as potassium or sodium hydroxide, to which the fibrous glass may be subjected for varying periods of time according to the results desired.

The effect of these solutions upon the glass also depends to a certain extent upon the composition of the glass, and more particularly upon the alkali content thereof, which is more directly affected by the alkali hydroxide solution. Thus glasses having greater percentages of alkali ingredients require less time of reaction or less concentration of alkali in order to produce the same effect as obtained with glasses having less alkali ingredients.

After the fibrous glass has been treated with the alkali solution for the desired period of time, it is preferably thoroughly washed to eliminate the alkali; and this may be done more effectively by washing the fibrous glass in a dilute acid solution such as dilute hydrochloric acid, nitric acid, sulphuric acid or other acids. When the alkali has been thoroughly washed from the surface of the fibrous glass, it is frequently desirable to apply coating materials such as mineral or vegetable oil, sulphonated castor oil, wax, tricresyl phosphate, resin, or other oleaginous or plastic substances and the treatment according to the present invention enables a more receptive bonding to take place.

Relubrication may be most easily accomplished simultaneously with the neutralization of the alkali; and may be done by incorporating the relubricating substance directly into the dilute acid solution. Thus, for example, the fibrous glass may be washed and treated with a dilute solution of hydrochloric acid having a small admixture, as, for example, 2% of sulphonated oil or other lubricating substance therein. As a result, the fabrics emerge from this treatment in a soft, flexible, strong, nonirritating state and have properties highly superior to the fibrous glass before the treatment.

As specific examples of my treatment, it is possible to boil a fabricated fibrous glass article in a solution of sodium or potassium hydroxide which may have a concentration of, for example, one-half normal. After boiling this material for a suitable period of time, for example, fifteen minutes, the fabricated article may be neutralized with a dilute hydrochloric acid solution having a 2% admixture of sulphonated castor oil or other lubricant. Fabrics treated in this manner are found to be stronger under pop tests, tension tests and abrasion tests than the same fabrics before treatment. Moreover, fabrics which were so coarse as to be brash before the test were much softer and substantially free from brashiness after the test.

It is also possible to treat the fabricated articles of fibrous glass for longer periods of time and at higher concentrations of the alkali hydroxide. This treatment when carried far enough may actually materially reduce the fiber diameter of the fibrous glass to such an extent that the glass fibers are extremely flexible, soft, and nonirritating.

As an example of this treatment, it is possible to prepare a 30% to 40% solution of alkali hydroxide, preferably potassium hydroxide, owing to its more gentle action upon the glass, and then treat the fibrous glass in this solution for a period of about a week, depending upon the original fiber diameter of the glass, its composition, and the strength of the solution. If higher temperatures are used, this period may be reduced. Thus, as a result, if the original fiber diameter of the glass fabric is in the range of about .0003 to .00035 inch, the fiber diameter at the end of this period of time may be in the neighborhood of about .00015 to .0002 inch, these figures being more or less approximate according to the exact conditions involved. At the end of the treatment with the alkali hydroxide, the fabrics should be rinsed in an aqueous bath to wash off the alkali. This bath may contain a small amount of sulphonated olive oil or other oleaginous substance serving to lubricate the individual fibers in the fabric. The wash water may also contain, and preferably does, a dilute acid solution such as hydrochloric acid serving to more completely eliminate and neutralize residual alkali. It may also contain a fatty acid or an ammonium salt or both which tend to maintain acid conditions on the fibers.

The fabrics emerging from this treatment are much finer, softer, more delicate, and lighter than before the treatment. They are completely free from brashiness and may be compared with Angora in softness. Moreover, I have found that when these fabrics are tested for strength and resistance to repeated fracture or abrasion, the fabrics stand up remarkably well, and frequently have strengths considerably higher than fabrics having a comparable amount of glass therein but which have not been so treated. If an interwoven cloth is treated in this manner, a large portion of the glass is actually removed, and the weave becomes more open in texture and the material is more flexible, pliable and softer. Thus, if desired, the porosity of cloths may be regulated. This is advantageous in designing a filter cloth or the like.

The treatment, however, may be applied to the yarn prior to weaving, which permits a fabric to be subsequently interwoven which is as hard and closely woven as desired. The quality of the individual fibers, with regard to flexibility and softness, however, will be retained. Fabrics treated in accordance with the present invention may be used to advantage in many situations, such as draperies, theatre curtains, awnings, clothing and other fabrics which are handled a good deal.

Modifications and variations may be resorted to within the spirit and scope of the present invention.

I claim:

1. The method of treating fabricated textile material composed of interwoven yarns of a multiplicity of fine glass fibers in substantial parallelism and closely held together in said textile material, which comprises reducing the diameter of the individual fibers throughout the textile material by subjecting the fibers throughout said yarns to a solution of an inorganic alkali selected from the group consisting of potassium hydroxide and sodium hydroxide, for a sufficient length of time to reduce the diameter of the fibers, and then neutralizing the alkali and removing it from the surfaces of said glass fibers by means of an acid wash.

2. The method of treating fabricated textile material composed of interwoven yarns of a multiplicity of fine glass fibers in substantial parallelism and closely held together in said textile material, which comprises reducing the diameter of the fibers throughout said textile material by boiling the material in a potassium hydroxide solution having sufficient strength to react with the surface of said glass fibers for a sufficient length of time to reduce the diameter of said fibers and then removing residual solution from said textile material.

3. The method of treating fabricated textile material composed of interwoven yarns of a multiplicity of fine glass fibers in substantial parallelism and closely held together in said textile material, which comprises reducing the diameter of the individual fibers throughout the textile material by subjecting the fibers throughout said yarns to a solution of sodium hydroxide having sufficient strength to react with the surface of said glass fibers for a sufficient length of time to reduce the diameter of said fibers, and then removing residual solution from said textile material.

4. The method of producing a fibrous glass textile composed of yarns of a multiplicity of fine glass fibers, which comprises treating the textile by boiling the textile in a solution of potassium hydroxide capable of dissolving away portions of the surfaces of said fibers and continuing the treatment until the surfaces of the fibers have been attacked by said solution and the diameter of the fibers has been reduced, removing residual solution from the treated textile, and neutralizing the surfaces of the fibers with an acid solution.

5. The method of producing a fibrous glass textile composed of yarns of a multiplicity of fine glass fibers, which comprises treating the textile by boiling the textile in a solution of metal alkali hydroxide selected from the group consisting of potassium hydroxide and sodium hydroxide capable of dissolving away portions of the surfaces of the fibers and continuing the treatment until the fiber surfaces have been attacked by said solution and the diameters of the fibers have been reduced, removing said solution from said textile, and neutralizing the surfaces of the fibers with an acid solution having an admixture of an oleaginous substance therein.

6. The method of treating textile yarns composed of a multiplicity of fine glass fibers in substantial parallelism and closely held together, which comprises reducing the diameter of the individual fibers throughout the yarns by treating the fibers with a strong solution of an alkali substance selected from the group consisting of potassium hydroxide and sodium hydroxide capable of dissolving away portions of the surfaces of the individual fibers, for a sufficient length of time to reduce the diameter of the fibers, and then removing free alkali from the treated yarns.

7. The method of controlling the porosity of a cloth composed of fibrous glass yarns of a multiplicity of fine glass fibers, which comprises reducing the diameters of the individual fibers throughout the cloth by subjecting the individual fibers to a solution of a substance selected from the group consisting of potassium hydroxide and sodium hydroxide capable of dissolving away portions of the surface of the individual fibers, for a sufficient length of time to reduce the diameter of the fibers, halting said treatment after a predetermined degree of such dissolving and prior to complete solution of said fibers, and washing the residuum of said substance from said cloth and applying a lubricant coating to said fibers.

PAUL EBAUGH.